Patented Oct. 12, 1954

2,691,323

UNITED STATES PATENT OFFICE 2,691,323

PALLADIUM OXIDE COATED ARTICLE

Richard F. Raymond, Saxonburg, Pa., assignor to Pittsburgh Plate Glass Company, Allegheny County, Pa., a corporation of Pennsylvania No Drawing. Application October 31, 1950, Serial No. 193,279

5 Claims. (Cl. 88—105)

This invention relates to articles of manufacture which are provided with a durable light-reflecting coating, and to methods of producing oxides, preferably in the form of reflecting films. According to this invention, novel articles, which comprise a glass or like base having a light-reflecting film of palladium oxide thereon, are provided.

According to one embodiment of the invention, a transparent, amber, high reflecting, mar-resistant mirror has been provided. Such mirror comprises a plate glass or like base provided with a high reflection mirror palladium oxide coating. This coating may be provided by contacting glass or like material, while hot, with palladium nitrate, $Pd(NO_3)_2$, as hereinafter described. Such mirrors have a visible light reflection factor around 35 to 45 percent and light transmissions of about 35 to 45 percent.

In the performance of the process, a glass or similar base is heated to an elevated temperature, usually above 400° F., and preferably above 800° F., but below the temperature at which the base tends to become molten, and the hot base is contacted with a palladium compound, particularly palladium nitrate or chloride, before cooling of the base below 400° F. occurs. This contact is usually effected by spraying the hot base with an aqueous or organic solution of the palladium compound. Such contact is normally effected by conducting the spraying or other treatment in atmospheric air, and therefore in the presence of oxygen, together with more or less atmospheric moisture. The maximum permissible temperature of the base will, of course, vary according to the nature of the base. For example, when lime soda glass is to be coated, a temperature of 800 to 1250° F. is suitable. When borosilicate glass is to be coated, higher temperatures, up to about 1300 or 1400° F. are permissible.

The products which are obtained by the process herein described, are found to comprise the glass, or like base, having a coating of a thin film which usually is transparent. This film is largely, if not entirely, comprised of palladium oxide, the composition being a mixture of palladium oxide and palladium; the sum of the concentrations of palladium and oxygen therein usually being above about 99 percent.

As previously noted, the process may be conducted by spraying or otherwise contacting the heated base with an aqueous solution of the palladium salt. Thus, a saturated solution of palladium nitrate, chloride, fluoride, or iodine, in water, may be sprayed over the heated base. Alternatively, organic solutions or vapors of any of these salts may be used, if desired. While such solutions may contain other compounds, the predominant film-forming component should be the palladium salt. Generally, presence of other salts of other metals adversely affect the character of the film. Hence, the palladium salt or its solution should not contain more than 5 percent (preferably less than 1 percent) by weight of other metals which tend to deposit with the palladium, based upon the weight of palladium.

The amount of the solution so used normally is quite small since the use of an excess of such a solution would tend to shock-chill the surface of the glass, might tend to cool the glass sheet so rapidly as to cause fracture thereof, or even to prevent substantial formation of the film. Usually, spraying the heated sheet for a few seconds, for example 1 to 20 seconds, with a fine spray, will be suitable for the purpose.

The films thus produced are quite thin, being substantially 5 to 250 millimicrons in thickness, usually between 25 to 75 millimicrons in thickness. Such films possess some transparency to visible light, and their reflectance will vary with the thickness of the film formed. Thicker opaque films may be deposited, if desired, by repeating the coating process, i. e., by heating, spraying, reheating, respraying, etc. Such films, if too thick, may have poor adhesion.

An outstanding characteristic of this mirror coating is its low light-reflection factor, as previously mentioned. Glass coated on one surface with an amber mirror palladium oxide film is especially suited for use as a low-reflection front surface mirror, such as for rear vision mirrors in automotive vehicles. One especially advantageous characteristic of these films is that backing lacquers, or coatings conventionally used with rear-vision mirrors comprising glass provided with lead sulfite mirror coatings, are not normally necessary. The electrical resistance of this amber palladium oxide film is about 30,000 ohms per unit square. They are also quite valuable for use in one-way vision mirrors.

The following examples are illustrative:

*Example 1.*—Polished plate glass sheets of lime soda glass, four inches by eight inches by $\frac{7}{32}$ inch (4" x 8" x $\frac{7}{32}$") were heated for two minutes at a furnace temperature of 1200° F., and each plate immediately thereafter was suspended in an atmospheric air of normal humidity (containing about 0.003 to 0.02 pound of water per pound of air). Ten cubic centimeters of an aqueous solution of a palladium nitrate salt containing 10 percent by weight of palladium nitrate was immediately sprayed upon one side of the heated glass plate, at a pressure of about 60 pounds per square inch from a conventional atomizing gun, and the plate was allowed to cool. The spray was very fine and approximately one minute was taken to apply the 10 cubic centimeters of solution. A transparent, amber, high-reflecting, mar-resistant film was formed on the glass base. The film has an electrical resistivity of about 30,000 ohms, a light transmission factor of 40 percent and a light reflectance factor of 37.2 percent.

*Example 2.*—A polished plate glass sheet of lime soda glass, four inches by eight inches by $\frac{7}{32}$ inch (4" x 8" x $\frac{7}{32}$") was heated for two minutes at a furnace temperature of 1200° F., and immediately thereafter suspended in atmospheric air of normal humidity (containing about 0.003 to 0.02 lb. of water per pound of air). Three cubic centimeters of an aqueous solution of a palladium nitrate containing 10 percent by weight of palladium nitrate was immediately sprayed upon one side of the heated glass plate, at a pressure of about 60 pounds per square inch, from a conventional atomizing gun, and the plate was allowed to cool. The film formed has a reflectance factor of approximately 15 percent and properties similar to the film formed in Example 1.

*Example 3.*—A polished plate glass sheet of lime soda glass, four inches by eight inches by $\frac{7}{32}$ inch (4" x 8" x $\frac{7}{32}$") was heated for two minutes at a furnace temperature of 1200° F., and immediately thereafter was suspended in atmospheric air of normal humidity. Ten cubic centimeters of an aqueous solution of palladium chloride was immediately sprayed upon one side of the heated glass plate, at a pressure of about 60 pounds per square inch, from a conventional atomizing gun, and the plate was allowed to cool. The film formed was transparent, amber, high-reflecting, and mar-resistant. It had a reflectance factor of about 23 percent and a transmission factor of about 71 percent.

The invention has been described with respect to the application of a high-reflecting film on lime soda glass bases. The invention may be extended into the provision of coatings upon other glass or refractory, and preferably transparent, products such as borosilicate glass, china, phosphate glass, lead X-ray glass, glass fiber, quartz, silicon carbide, aluminum oxide, mica, stone, tungsten carbide, and other refractory articles. Usually, the bases upon which a high reflecting film is to be applied is in the form of a sheet. It will be understood that the term "sheet" includes a substantially smoothly surfaced ceramic material whose surface may either be flat or curved.

As shown in the above examples, an aqueous solution of the salt was used. Such solutions should be true solutions, as distinguished from colloidal suspensions, to insure clarity of the films produced. Organic solvents, such as ethanol, methanol, or like alcohol, may be used in lieu of water.

The concentration of the palladium salt, in the aqueous or like solvents, depends upon the solubility thereof. Excessively dilute solutions are objectionable since they tend to shock-chill the glass or other refractory base. Saturated solutions are generally suitable. Preferably, the solution should contain at least 2 percent by weight of the palladium salt. Other elements may be present where they do not adversely affect production of the above described films.

Although the present invention has been described with reference to the specific details of certain embodiments thereof, it is not intended that such details shall be regarded as limitations upon the scope of the invention except insofar as included in the accompanying claims.

I claim:

1. An article of manufacture suitable for use as a mirror comprising a transparent sheet of refractory material having a substantially smooth surface and a light reflecting coating which is predominantly oxide of palladium on said surface.

2. The product of claim 1 wherein the coat is of such thickness that it has an amber color and a light reflection factor below 20%.

3. The product of claim 1 wherein the coating is of such thickness that it has an amber color and a light reflection factor between 35 and 45%.

4. An article of manufacture suitable for use as a mirror comprising a sheet of glass having a substantially smooth surface and a light reflecting coating which is predominantly palladium oxide on said surface.

5. An article of manufacture suitable for use as a mirror comprising a sheet of refractory material and an amber colored light reflecting coating predominantly of palladium oxide and of such thickness that it has a light reflecting factor between about 8 and 45% on said surface.

References Cited in the file of this patent

UNITED STATES PATENTS

| Number | Name | Date |
| --- | --- | --- |
| 2,118,795 | Littleton | May 24, 1938 |
| 2,292,026 | Gillet | Aug. 4, 1942 |
| 2,293,822 | Haven | Aug. 25, 1942 |
| 2,344,208 | Kirkpatrick | Mar. 14, 1944 |
| 2,429,420 | McMaster | Oct. 21, 1947 |
| 2,475,155 | Rosenblatt | July 5, 1949 |

OTHER REFERENCES

Smith, Chem. Abstracts, vol. 27, page 881.
Wilson, Chem. Abstracts, vol. 33, page 9119.